May 13, 1969

D. E. WOLFORD 3,443,763

GRANULAR DISTRIBUTOR

Filed Oct. 23, 1965

INVENTOR.
DALE E. WOLFORD
BY *Hamilton & Cook*
ATTORNEYS

United States Patent Office 3,443,763
Patented May 13, 1969

3,443,763
GRANULAR DISTRIBUTOR
Dale E. Wolford, Ashland, Ohio, assignor to The F. E. Myers & Bro. Co., Ashland, Ohio, a corporation of Ohio
Filed Oct. 23, 1965, Ser. No. 502,836
Int. Cl. E01c *19/20;* F04d *29/24*
U.S. Cl. 239—666                                    12 Claims

ABSTRACT OF THE DISCLOSURE

A granular distributor for directively spreading material along a roadside. The apparatus utilizes a conveyor-like system to feed the material to a dispensing head which distributes the material at a rate which is controlled independently of the feed rate. A selectively positionable deflector is mounted in the path of the material as it is discharged out of the orifice of the dispensing head so that a uniform distribution of the material is obtained over the entire swath.

---

The present invention relates generally to granular distributor equipment. More particularly, the invention relates to apparatus for the distribution of granular materials from a mobile carrier. Specifically, the invention relates to a distributor for uniformly spreading granular materials over a horizontal area from a mobile carrier and stockpile.

In recent years, there has been an increased interest in the application of fertilizers and pesticides to the right-of-way areas bordering highways and roads. One of the primary problems in these roadside areas is the deleterious incidence of erosion which can best be remedied by the development of heavy turf. The application of fertilizers is the most effective means of stimulating or inducing a heavy turf development, while achieving a pronounced beautification in the form of a good strand of grass. Due to the tendency of these areas to accumulate water and support heavy growth, there is frequently a proliferation of insects and other pests which are best controlled by the dispersion of insecticides and pesticides.

All of the various types of fertilizer and pesticide distributors in use characteristically provide a very limited area of coverage, thereby necessitating a plurality of passes or runs to achieve coverage of an area having any appreciable width. Further, most right-of-way areas have numerous obstructions in the form of signs, fences, markers, culverts, cut and fill areas, and the like. Therefore, the employment of conventional equipment makes the distribution of these materials slow, expensive, and, in some cases, even dangerous.

Accordingly, a principal object of the invention is to provide a distributor which will deliver a fertilizer or pesticide out to an appreciable distance from the distributor, whereby the spreading can be accomplished from the roadway.

Another object of the invention is to provide a distributor which will dispense materials in the advantageous granulated solid form.

A further object of the invention is to provide a granular distributor which can be detachably mounted on a mobile carrier or truck having a conventional container, such as a salt body.

An additional object of the invention is to provide a granular distributor having a feed mechanism which transfers a controlled supply of granulated solid material from a truck bed or other container to a dispenser head.

Still another object of the invention is to provide a granular distributor giving substantially uniform distribution of a granulated material over the entire swath covered, independent of the distance from the distributor.

A further object of the invention is to provide a granular distributor having a discharge opening which may be adjusted in elevation or depression to compensate for variations in terrain.

A still further object is to provide a granular distributor having a deflector selectively controlling the swath width and quantity of material dispersed in the area immediately adjacent the distributor.

Other objects are to provide a granular distributor which is inexpensive, easy to maintain and safe to operate.

Various other objects and advantages will appear from the following description taken in conjunction with the attached drawings, and the novel features will be particularly pointed out hereinafter in conjunction with the appended claims.

A granular distributor according to the invention has a motor-driven dispenser supplied with granular material from a remote stockpile and is adapted for mounting on a mobile carrier such as a truck. The dispenser has an engine driven shaft mounting an impeller having vanes with brushes at the extremity thereof engaging the interior of a rotatable housing. Granular material is supplied by conveyors to the hub of the impeller, displaced outwardly by centrifugal force, and discharged from the vanes tangentially through a discharge orifice which is positioned in elevation and depression by selective rotation of the dispenser housing. The discharge orifice adjustably carries a deflector vane which is positioned axially outwardly of the discharge orifice and modifies the output to provide a controlled dispersion of the granulated material in the area proximate the dispenser.

Figure 1:
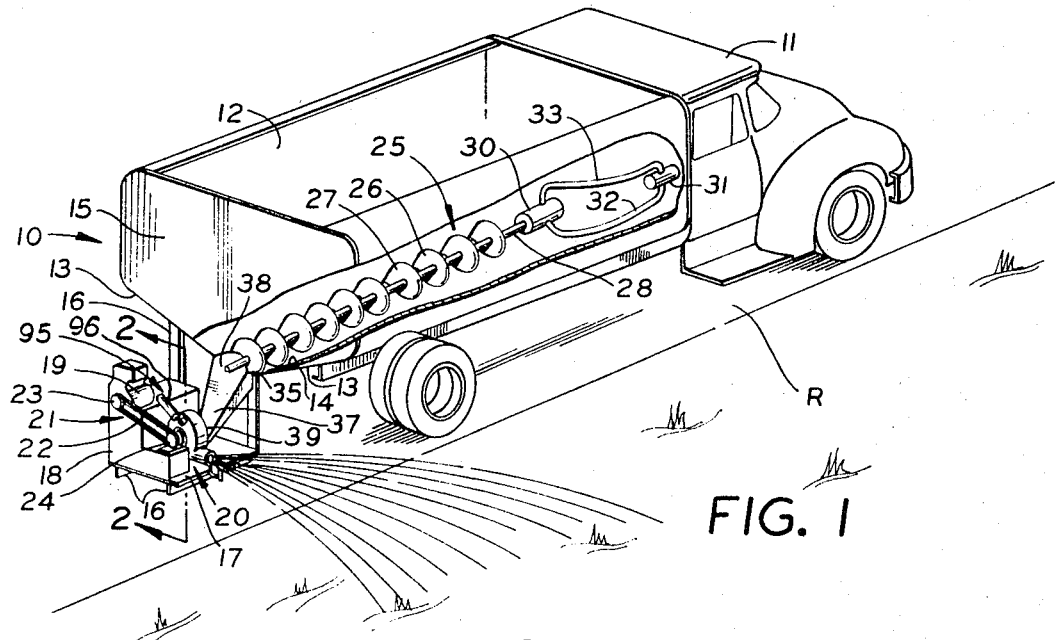
FIG. 1 is a perspective view of a granular distributor according to the invention mounted on the rear of a truck, with portions of the truck bed broken away to disclose a spiral conveyor and its drive.

Referring now to the drawings and particularly to FIG. 1, a granular distributor, generally indicated by the numeral 10, according to the present invention is adapted for use in conjunction wtih a mobile carrier such as a truck 11. As shown, the truck 11 is equipped with a salt spreader bed 12 having sloping bottom panels 13 which converge in a substantially medial trough 14. Although other types of truck beds may be employed equally well, a salt spreader bed 12 is particularly advantageous since it adapts ideally to the granular distributor 10 and provides an out-of-season use for equipment which would normally stand idle.

The primary components of the granular distributor 10 are preferably mounted at the tail gate or rear portion 15 of the truck bed 12. A pair of L-shaped beams 16 having an angle cross section may be attached to the truck bed 12 for the seating and attachment of a support platform 17. Seated on the platform 17 is a combination frame and housing 18 to which an engine 19 and a dispenser assembly, generally indicated by the numeral 20, are attached. The engine 19 may be a conventional gasoline engine, or any other comparable power source which will supply the minimal rotational power requirements.

Figure 2:
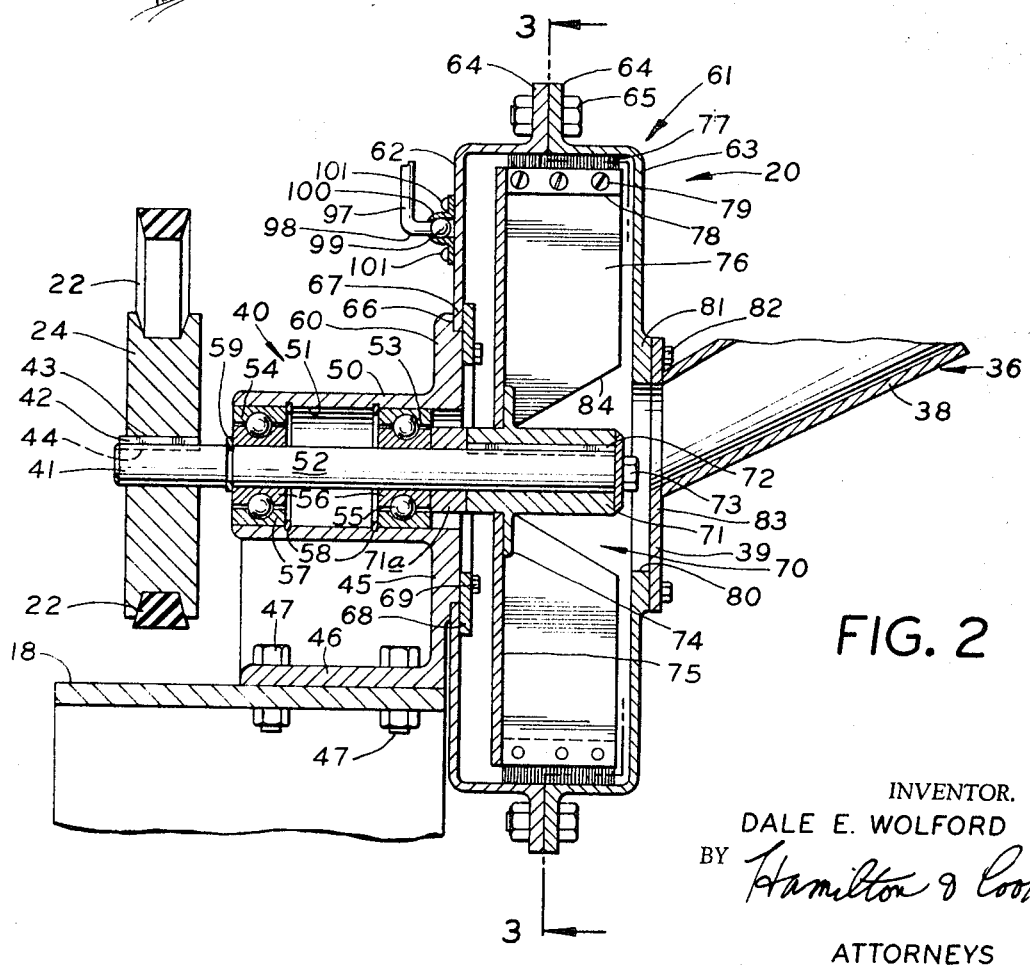
FIG. 2 is a section view of the dispenser head of the granular distributor including the drive linkage and mounting, taken substantially on line 2—2 of FIG. 1.

Power is transferred from the engine 19 to the dispenser 20 by a belt drive, generally indicated by the numeral 21. The belt drive 21 has as its connecting member a flat belt or, as shown, a V-belt 22 of conventional design. The desired power and angular speed are supplied to the dispenser 20 by selection of appropriate pulleys 23 and 24 which are attached to the engine 19 and dispenser 20, respectively (FIG. 2).

In order to provide a regulated supply of granulated material to the dispenser 20, the truck bed 12 is fitted with a feed mechanism, generally indicated by the numeral 25. A spiral conveyor 26 is positioned in the trough 14 of truck bed 12 and preferably extends substantially the entire length thereof to empty the bed 12 of its contents. Since the feed mechanism 25 is normally operated generally on the horizontal with only intermittent inclination as the truck 11 follows a road bed R, a standard pitch helical screw 27 will handle the granulated materials contemplated without appreciable reduction in capacity.

The spiral conveyor 26 has a longitudinal shaft 28 which carries the helical screw 27 and is driven at its forward end by a hydraulic motor 30 of conventional design. A variable speed control 31 in the form of a variable displacement hydraulic pump may be employed to adjust the rotation rate of the shaft 28 and the delivery rate of spiral conveyor 26. The hydraulic motor 30 is linked to such a variable speed control 31 by hydraulic lines 32 and 33. For convenient remote actuation, the variable speed motor 31 may be provided with suitable controls (not shown) located at the operator's station in the cab on truck 11.

At the end of shaft 28 opposite hydraulic motor 30 and near the juncture of trough 14 and tail gate 15, the truck bed 12 has an outlet or aperture 35. The material moved by spiral conveyor 26 is dispatched to the outlet 35 from which it is gravity fed into a chute 36 which approximates a truncated pyramid. The chute 36 has an upper end 37, which seats against tail gate 15 and enclosed outlet 35, and a lower end 38 terminating in an attachment plate 39 which mates with the dispenser assembly 20 in a manner described hereinafter in detail. If desired, the chute may have a cutoff gate (not shown) remotely controlled from the cab of truck 11 for instaneous shutoff.

Referring now to FIG. 2, the motive power supplied by the engine 19 through the belt drive 21 is transmitted to the dispenser assembly 20 by a drive assembly, generally indicated by the numeral 40. The primary through component of the drive assembly 40 is a shaft 41 upon which the pulley 24 of belt drive 21 is mounted in nonrotational engagement. This interrelation may be achieved by a feather key 42 inserted in keyways 43 and 44 provided in the pulley 24 and shaft 41, respectively.

The drive assembly 40 has a U-shaped bearing bracket 45 which rotatably supports the shaft 41. One leg of bracket 45 is an attachment flange 46 which reposes on the frame 18 seated on platform 17 and is secured as by the bolts 47. The other leg of U-shaped bearing bracket 45 is a cylindrical bearing block 50 having an axial through bore 51 in which a medial portion 52 of shaft 41 is journaled. Rolling-contact bearings 53 and 54 are seated near the extremities of bore 51 in housing 50. Due to rather light radial and thrust loading, the bearings 53, 54 may be identical ball bearings having central ball members 55 enclosed in inner races 56 and outer races 57. In order to prevent creeping or spinning of the bearing races and the attendant accelerated wear, the outer bearing races 57 have snap rings 58 located on the bore 51 of bearing block 50. The inner race 56 of bearing 54 is positioned by a snap ring 59 on shaft 41. The inner race 56 of bearing 53 is retained by structure to be hereinafter described.

Figure 3:
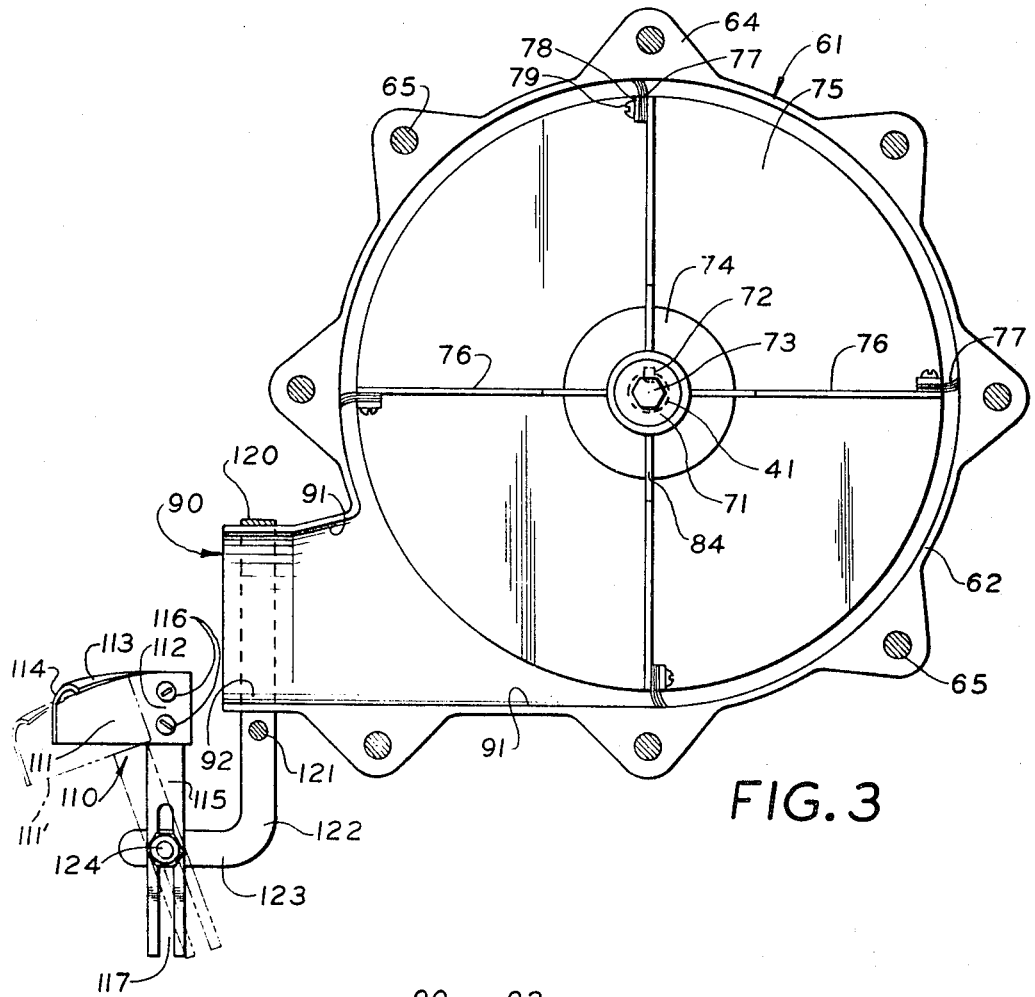
FIG. 3 is a section view, taken substantially on line 3—3 of FIG. 2, through the housing of the dispenser head showing particularly the impeller portion.

Referring now to FIGS. 2 and 3, the drive assembly 40 and dispenser assembly 20 are integrally linked by a radial flange 60 of bearing block 50 which rotatively supports a substantially circular housing, generally indicated by the numeral 61, of dispenser assembly 20. For ease of maintenance, the circular housing 61 is preferably of two-piece construction having an inner casing 62 and an outer casing 63, both provided with mating radial flanges 64 which are secured by a series of bolts 65. The radial flange 60 of bearing block 50 has an axial notch 66 which seats the radially inner edge 67 of inner casing 62. The housing 61 is held axially fixed but rotationally free with respect to bearing block 50 by means of a clamp ring 68 which is attached to radial flange 60, as by a plurality of machine screws 69 or other similar fastening means.

The drive assembly 40 and dispenser assembly 20 are further operationally linked by the extension of shaft 41 into the housing 61 where an impeller, generally indicated by the numeral 70, is mounted. The impeller 70 has a central hub 71 which engages the end of shaft 41 and is rotationally restrained by a feather key 72 in a manner identical to the attachment of pulley 24 at the opposite end of shaft 41. The hub 71 is axially affixed on shaft 41 by means of a tap bolt 73 inserted in the end of shaft 41. Hub 71 has an axial extension or a separate spacer 71a extending into bearing block 50 to axially position the hub 71 in housing 61 and frictionally retain the inner race 56 of bearing 53.

Displaced inwardly of the extremity of shaft 41, the hub 71 has a radial flange 74 which carries a flat circular disc 75 to which it is rotationally affixed, as by welding. Extending radially outwardly of the hub 71 and axially of the disc 75 are a plurality of spaced vanes 76. For purposes of the present invention, four vanes 76 with 90-degree spacing are sufficient, although more or fewer vanes may be employed. Since excessive contact with the vanes 76 can cause fracturing or pulverizing of the granulated solid materials, each of the vanes 76 has a strip brush 77 providing a seal with the housing 61, thereby reducing the tendency of the granulated materials to recirculate with the impeller 70. The strip brushes 77 are preferably removably secured to the vanes 76 by a face plate 78 and machine screws 79, or other temporary fastening means, for intermittent replacement of the brushes 77.

As best seen in FIG. 2, granulated material is supplied to the impeller 70 of dispenser assembly 20 by an axial feed. The outer casing 63 of housing 61 has a feed opening 80 which is substantially concentric with the hub 71 of impeller 70. The area adjacent feed opening 80 forms a flange 81 to receive the attachment plate 39 of chute 36 which is appropriately secured, as by machine screws 82. In order to supply the material as near to the hub 71 as possible, the attachment plate 39 of chute 36 may have a lower vertical member 83 which extends upwardly to a position substantially laterally of hub 71. As the material exits from chute 36, passes through feed opening 80 and is deposited in the area of hub 71, there is a possibility of interference with the rotating vanes 76 of impeller 70. This problem is eliminated by cutting away a portion of vanes 76 near the hub 71, as indicated by the angle cut 84 in FIG. 2.

Figure 4:
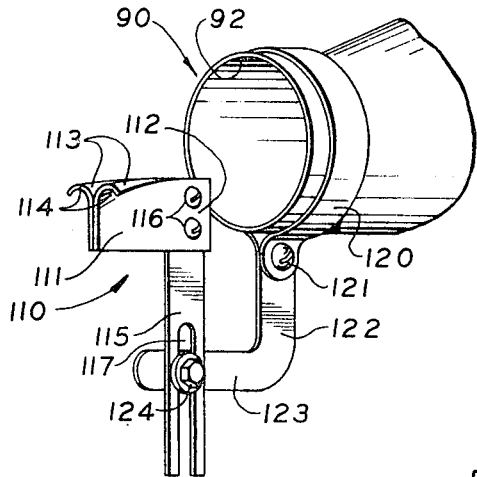
FIG. 4 is a fragmentary perspective view of the discharge orifice of the dispenser head and the associated deflector vane.

Once located centrally of the rotating vanes 76 of impeller 70, the granulated material is centrifugally displaced radially outwardly toward the strip brushes 77, while being carried circumferentially on the vanes 76. The housing 61 is totally sealed to retain the granulated material, except for feed opening 80 and a discharge orifice, generally indicated by the numeral 90 in FIGS. 3 and 4. The discharge orifice 90 has a guide wall 91 extending generally tangentially to the disc 75 of impeller 70 which tapers to form a nozzle 92 of preferably circular cross section. For ease of construction, the discharge orifice 90 may be formed integrally with the housing 61, as shown, or, alternatively, as a separate unit. Although the housing 61 and guide wall 91 may be in the general form of a volute as is common in blowers and pumps, the disclosed circular configuration with tangential discharge is preferred in the handling of granular solids to preclude the accumulation of material within the housing and outwardly of vanes 76 and brushes 77.

The nozzle 92 of discharge opening 90 can be rotationally positioned in elevation or depression to a desired output angle in order to compensate for variations in terrain between the roadway R and the adjacent right-of-way. This adjustment is made possible by the previously described rotationally free mounting of the housing 61 on the bearing block 50. The output angle control, generally indicated by the numeral 95 in FIG. 1, extends from the frame 18 atop platform 17 to the housing 61 of dispenser 20. A hydraulic cylinder 96 is pivotally attached to the frame 18 and has an extending control rod 97 (FIG. 2) which is pivotally attached to the inner casing 21. The rod 97 has a right angle end bar 98 with an attached ball 99 which engages a bulbous socket 100 secured to casing 62 by machine screws 101. The hydraulic cylinder 96 is preferably provided with remote controls located in the cab of truck 11 for convenient adjustment during operation.

Although the output angle control 95 determines to a large degree the area over which the granulated material is distributed, the discharge orifice 90 leaves an appreciable distance adjacent to the distributor 20 without coverage. The dispersion in this proximate area is selectively controlled by a deflector vane, generally indicated by the numeral 110 in FIGS. 3 and 4. In order to achieve the dual control function, a bifurcated diverter head 111 is located generally axially of the discharge orifice 90 to redirect a portion of the solid material entrained in the discharge blast.

To avoid a total disruption of the discharge blast directivity, the bifurcated diverter head 111 has planar surfaces 112 nearest the nozzle 92. Axially outwardly from nozzle 92, the diverter 111 is split into identical reverse curved surfaces 113 which terminate in ends 114 having a cross section approximating an inverted letter J. The positioning of the deflector vane 110 relative to nozzle 92 is achieved by a support bar 115 attached to the diverter head 111 at one of its ends as by bolts 116 and having a longitudinal slot 117 in its second end. A strap 120 encircles the nozzle 92 and is selectively attached thereto by a bolt 121. The strap 120 has an L-shaped strut 122, wherein one leg 123 has an adjustable bolt 124 which selectively engages the slot 117 to position support bar 115. As viewed in FIGS. 3 and 4, movement of the diverter head 111 downwardly would decrease the quantity of material deflected, while a pivoting displacement away from the nozzle 92 would decrease the swath width. Therefore, adjustment from the solid line position of the diverter head 111 in FIG. 3 to the phantom line representation 111' would serve to decrease the quantity of material diverted and decrease the swath width in the area proximate the dispenser 20.

A preferred form of the invention has been shown and described in sufficient detail to enable one skilled in the art to practice the invention.

What is claimed is:

1. Apparatus for the controlled distribution of granulated material from a mobile carrier comprising, dispenser means, a first power means regulating said dispenser means, feed means providing a controlled supply of granulated material to said dispenser means, a second power means regulating said feed means, orifice means directing the output of said dispenser means, and deflector vane means modifying the output of said orifice means, whereby a controlled dispersion of granulated material is provided outwardly of said dispenser means.

2. Apparatus according to claim 1, wherein said deflector means comprises, a bifurcated diverter located substantially axially of said orifice means.

3. Apparatus according to claim 1, wherein support means selectively positions said deflector means radially, axially, circumferentially and pivotally of said orifice means.

4. Apparatus according to claim 1, wherein said feed means comprises, conveyor means regulating movement of granulated material within said mobile carrier and chute means connecting said conveyor means and said dispenser means.

5. Apparatus according to claim 4, wherein said conveyor means has a spiral screw driven at a selected rotation rate by said second power means.

6. Apparatus according to claim 1, wherein said dispenser means comprises, impeller means receiving granulated material from said feed means and forcing said material out said orifice means.

7. Apparatus according to claim 1, wherein said dispenser means comprises, a housing, an impeller mounted in said housing and having a plurality of radial vanes, and a shaft rotating said impeller in said housing to impart centrifugal force to said granulated material.

8. Apparatus according to claim 7, wherein said orifice means is oriented substantially tangentially of said impeller of said dispenser means.

9. Apparatus according to claim 6, wherein said impeller means has radial vanes with attached brushes to reduce recirculation of said granulated material within said housing.

10. Apparatus according to claim 6, wherein said orifice means comprises, a guide wall oriented substantially tangentially of said impeller and a nozzle at the extremity of said guide wall.

11. Apparatus according to claim 1 having control means selectively positioning said orifice means in elevation and depression.

12. Apparatus according to claim 7, wherein a control rod selectively rotationally positions said dispenser housing carrying said orifice means.

References Cited

UNITED STATES PATENTS

| | | | |
|---|---|---|---|
| 425,338 | 4/1890 | Muller | 239—689 X |
| 926,473 | 6/1909 | Disbrow | 239—515 X |
| 2,296,909 | 9/1942 | Dake | 239—665 |
| 2,343,714 | 3/1944 | Swenson | 103—111.1 |
| 2,677,550 | 5/1954 | Berger et al. | 239—650 X |
| 2,956,809 | 10/1960 | Huddle et al. | 239—666 |
| 3,138,329 | 6/1964 | Swanson | 239—77 |
| 3,210,084 | 10/1965 | Van Der Lely et al. | 239—666 X |
| 922,664 | 5/1909 | Burden | 239—510 |

EVERETTE W. KIRBY, *Primary Examiner.*

U.S. Cl. X.R.

103—111.1; 222—371; 239—672, 675, 668, 679, 689